United States Patent
Butt et al.

(10) Patent No.: US 10,937,453 B1
(45) Date of Patent: Mar. 2, 2021

(54) MAGNETIC TAPE DEVICE CAPABLE OF SELECTING CODEWORD REWRITE BASED ON DETERMINED THRESHOLD

(71) Applicant: International Business Machines Corporation, Armonk, NY (US)

(72) Inventors: Kevin Dale Butt, Tucson, AZ (US); Roy Cideciyan, Rueschlikon (CH); Simeon Furrer, Altdorf (CH); Masayuki Iwanaga, Urayasu (JP); Mark Alfred Lantz, Adliswil (CH); Keisuke Tanaka, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/831,527

(22) Filed: Mar. 26, 2020

(51) Int. Cl.
    *G11B 5/584*      (2006.01)
    *G11B 5/55*      (2006.01)
    *G06F 3/06*      (2006.01)
    *G11B 5/588*      (2006.01)

(52) U.S. Cl.
CPC ............ *G11B 5/5508* (2013.01); *G06F 3/067* (2013.01); *G06F 3/0619* (2013.01); *G06F 3/0656* (2013.01); *G06F 3/0682* (2013.01); *G11B 5/5504* (2013.01); *G11B 5/584* (2013.01); *G11B 5/588* (2013.01)

(58) Field of Classification Search
None
See application file for complete search history.

(56) References Cited

U.S. PATENT DOCUMENTS

| | | | |
|---|---|---|---|
| 8,259,405 B2 | 9/2012 | Cideciyan et al. | |
| 8,276,045 B2 * | 9/2012 | Cideciyan | G11B 20/1202 714/771 |
| 8,495,470 B2 * | 7/2013 | Cideciyan | G06F 3/0619 714/771 |
| 8,910,012 B2 * | 12/2014 | Blaum | H03M 13/293 714/755 |
| 8,922,927 B1 | 12/2014 | Peng et al. | |

(Continued)

OTHER PUBLICATIONS

Saha et al., "Bit-Interleaved Polar Coded Modulation with Iterative Decoding," IEEE, 2018, 8 pages.

(Continued)

*Primary Examiner* — Tan X Dinh
(74) *Attorney, Agent, or Firm* — Zilka-Kotab, P.C.

(57) ABSTRACT

A methodology that enables, for example, tape drive operation at lower SNR and/or reduced rewrite area uses a first threshold T and a second threshold r for a rewrite condition. Codeword interleaves (CWIs) in a data set are written onto a plurality of simultaneously-written parallel tracks of a magnetic recording medium, read back and error correction decoded. A determination is made as to whether at least one of the C1 or C1' codewords in each decoded CWI contains more byte errors than the second threshold r of the rewrite condition. A number of CWIs in a rewrite buffer are according to the following criteria: $b_i'=b_i-T$ when $b_i$ is greater than the first threshold T, and $b_i'=0$ when $b_i$ is less than or equal to the first threshold T.

20 Claims, 13 Drawing Sheets

(56) References Cited

U.S. PATENT DOCUMENTS

| | | | |
|---|---|---|---|
| 8,929,014 B2* | 1/2015 | Cideciyan | G11B 5/55 360/48 |
| 9,064,541 B2* | 6/2015 | Cideciyan | H03M 13/29 |
| 9,401,176 B2* | 7/2016 | Cideciyan | G11C 29/00 |
| 9,542,265 B2* | 1/2017 | Cideciyan | G06F 11/1012 |
| 9,595,301 B2* | 3/2017 | Bentley | G11B 27/36 |
| 9,612,905 B2* | 4/2017 | Cideciyan | G06F 3/064 |
| 10,152,375 B2* | 12/2018 | Cideciyan | G11B 5/00817 |
| 10,339,971 B1* | 7/2019 | Butt | G11B 20/1866 |
| 10,418,062 B2 | 9/2019 | Cideciyan et al. | |
| 10,691,376 B2* | 6/2020 | Butt | G06F 3/0604 |
| 2016/0277145 A1 | 9/2016 | Grant et al. | |
| 2018/0173440 A1 | 6/2018 | Cideciyan et al. | |
| 2019/0189156 A1 | 6/2019 | Butt et al. | |
| 2019/0189157 A1 | 6/2019 | Cideciyan et al. | |
| 2019/0214053 A1 | 7/2019 | Butt et al. | |
| 2019/0311741 A1 | 10/2019 | Cideciyan et al. | |

OTHER PUBLICATIONS

Cideciyan et al., "Performance of Interleaved Block Codes With Burst Errors," IEEE Transactions on Magnetics, vol. 55, No. 3, Mar. 2019, 5 pages.

Alhussien et al., "The Error-Pattern-Correcting Turbo Equalizer," arXiv preprint, Sep. 6, 2010, 46 pages, retrieved from https://arxiv.org/pdf/1003.5648.pdf.

Arslan et al., "Cycle Slip Detection and Correction Through Classification of Modulation Code Failures," IEEE Transactions on Magnetics, vol. 49, No. 9, Sep. 2013, pp. 4988-4998.

Cideciyan et al., "Product Codes for Data Storage on Magnetic Tape," IEEE Transactions on Magnetics, vol. 53, No. 2, Feb. 2017, 10 pages.

Cideciyan et al., U.S. Appl. No. 15/847,774, filed Dec. 19, 2017.
Cideciyan et al., U.S. Appl. No. 16/450,814, filed Jun. 24, 2019.
Butt et al., U.S. Appl. No. 15/847,751, filed Dec. 19, 2017.
Butt et al., U.S. Appl. No. 16/358,131, filed Mar. 19, 2019.
Butt et al., U.S. Appl. No. 16/116,792, filed Aug. 29, 2018.
Greco et al., U.S. Appl. No. 16/167,319, filed Oct. 22, 2018.
Greco et al., U.S. Appl. No. 16/167,305, filed Oct. 22, 2018.
Greco et al., U.S. Appl. No. 16/167,286, filed Oct. 22, 2018.

\* cited by examiner

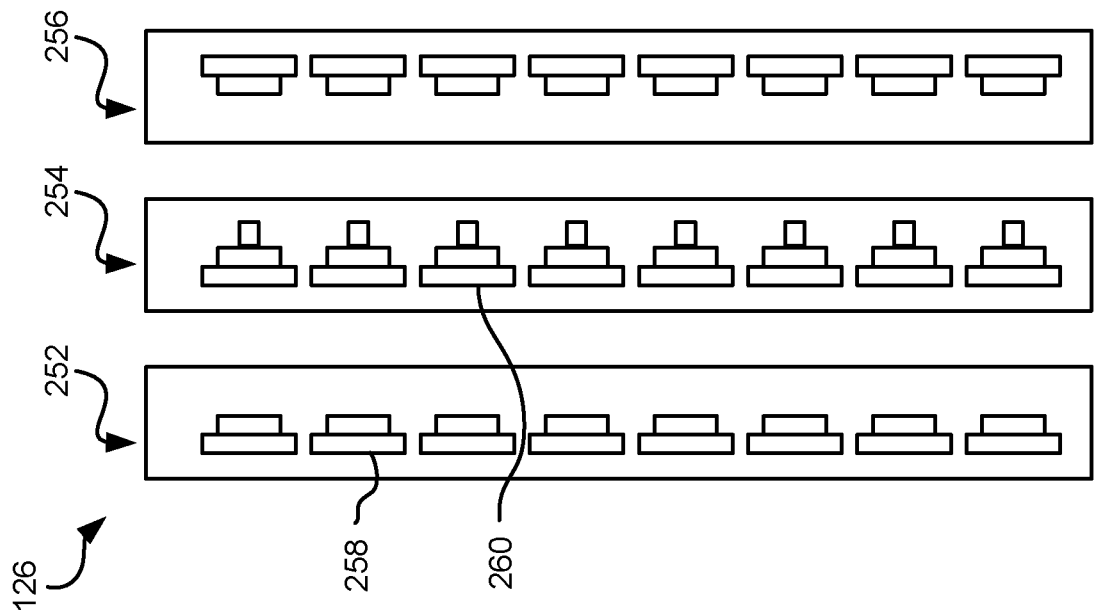
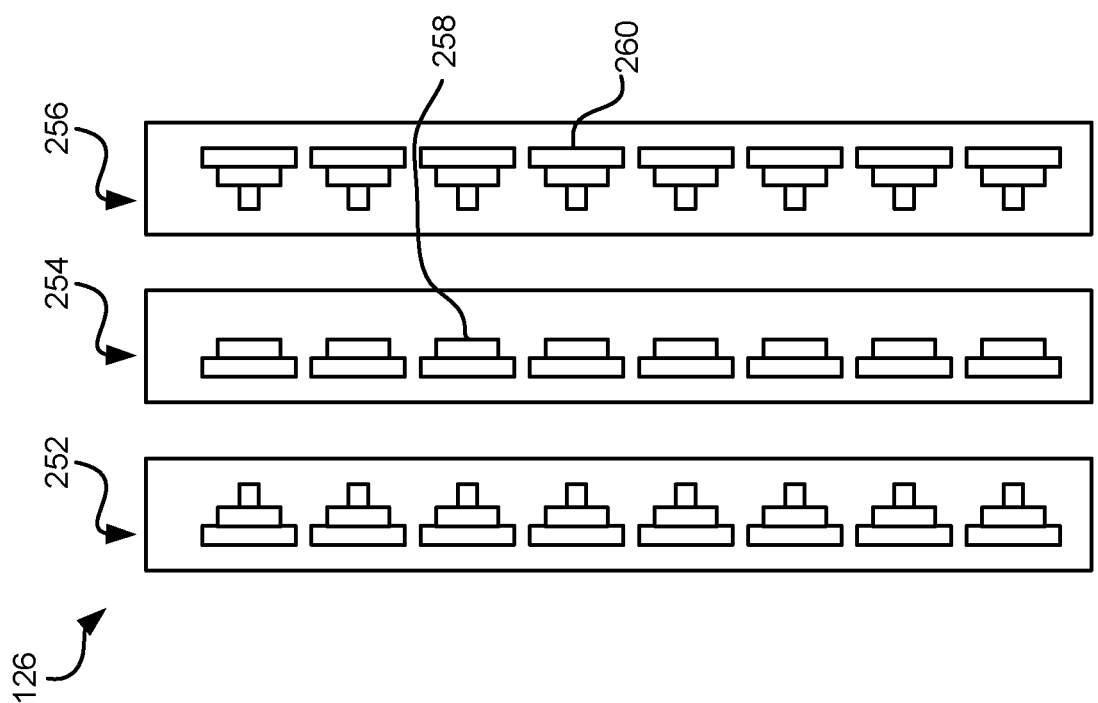

US 10,937,453 B1

MAGNETIC TAPE DEVICE CAPABLE OF SELECTING CODEWORD REWRITE BASED ON DETERMINED THRESHOLD

BACKGROUND

The present invention relates to data storage systems, and more particularly, this invention relates to enabling selection of codewords to rewrite in a data storage system based on thresholds, thereby enabling selective operation at lower signal to noise ratio (SNR) and/or reducing a rewrite area.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on magnetic tape, and decreasing the thickness of the magnetic tape medium. However, the development of small footprint, higher performance tape drive systems has created various challenges ranging from the design of tape head assemblies for use in such systems to dealing with tape dimensional instability.

For many years, tape storage has offered advantages in terms of cost and storage density compared to other storage technologies, such as disk storage. Data is stored in magnetic tape media in data sets, where a data set (DS) is an internal physical data block on tape. A user data segment refers to the chunk of data the user is interested in storing with integrity. Note that a user data segment may vary in size from 1-byte to the entirety of a tape (terabytes (TBs)) or more. Typical applications of tape storage include back-up and archival storage applications.

These applications typically require a very high degree of reliability when accessing the data on read-back. An important feature to provide this high reliability is the so-called read-while-write operation of the tape drive. During the read-while-write operation, faulty error correction coding (ECC)-protected data segments (referred to hereinafter as faulty "code-word interleaves", or "CWIs") are stored in a buffer, then rewritten at the end of the DS to assure that the data is correctly written during the write process. This feature is important because it significantly improves the reliability of the write operation.

At the beginning of cartridge life, the average number of rewritten CWI sets per DS is currently limited to a rewrite rate corresponding to two rewritten CWI sets per DS, which is about 1% for a C2 code of length 96 bytes. Currently this limit is reached when the bit error rate at the C1 decoder input is about $10^{-4}$. Currently, about 3% of tape is reserved for rewrite.

It is possible to operate read channels with improved timing recovery at lower SNR to enable a real density scaling while maintaining a user bit error rate (BER) at the output of the error correction decoder of $10^{-20}$ on reads through the use of iterative decoding. However, with the aforementioned rewrite scheme, reducing the SNR would result in a loss of capacity due to excessive rewrites. Hence improvements in the rewrite strategy would be desirable to take advantage of the potential gain of iterative decoding. Specifically, it would be desirable to operate the channel at lower SNR values by increasing the error rate at which a low (e.g., 1%) rewrite rate is achieved by about one order. It would be beneficial to allow a higher bit error rate at the C1 decoder input during operation at lower SNR without increasing the average rewrite area or to reduce the rewrite area without decreasing the SNR operating point. What is needed is a way to enable selective operation at lower SNR and/or reduced rewrite area.

A cloud drive refers generally to a tape drive used in a system in which the user data segment is protected by some scheme outside the tape drive (e.g., ECC encoding with different shards of the ECC encoded data sent to different tapes, duplicate copies of the data sent to different tapes, etc.). Such protection schemes can survive a certain level of loss (e.g., loss of n numbers of data blocks in some distribution). In a cloud drive, it would be desirable to allow the host to control the amount of rewrite and to dynamically adjust the rewrite scheme on-the-fly, perhaps even including turning the rewrite scheme off in the extreme case.

SUMMARY

Various aspects of the present invention enable tape drive operation at lower SNR and/or reduced rewrite area using techniques described herein. In either or both cases, the amount of data storable on a medium is increased.

For example, SNR decreases as data density increases. A lower SNR tends to result in more errors, resulting in more data to rewrite. However, in some approaches presented herein, the number of rewrites is reduced in spite of a lower SNR, avoiding the need to dedicate more media space for rewrites. In other approaches, the SNR may be maintained, but the dedicated rewrite area may be reduced in size, thereby providing more space for user data.

Various aspects of the present invention enable a host to control the amount of rewriting in a cloud drive using techniques described herein.

A computer-implemented method, according to one aspect of the present invention, includes determining a first threshold T and a second threshold r for a rewrite condition. The first threshold T is greater than zero, and the second threshold r is greater than or equal to zero. Codeword interleaves (CWIs) in a data set are written onto a plurality of simultaneously-written parallel tracks of a magnetic recording medium, where the data set includes a set of S sub-data sets, and where the set of S sub-data sets include a set number of the CWIs where the set number of the CWIs is associated with the length of a C2 code. The CWIs are read immediately after the CWIs are written to the magnetic recording medium. Error correction decoding is performed on the read CWIs, where each CWI includes a set number of C1 or C1' codewords. A determination is made as to whether at least one of the C1 or C1' codewords in each decoded CWI contains more byte errors than the second threshold r of the rewrite condition. For each sub-data set i in the set of S sub-data sets, where i is greater than or equal to 1 and less than or equal to S, a number $b_i$ of the CWIs from sub-data set i, that satisfy the rewrite condition, are inserted into a rewrite buffer. For each sub-data set i in the set of S sub-data sets, where i is greater than or equal to 1 and less than or equal to S, a number $b_i'$ of the $b_i$ CWIs in the rewrite buffer are rewritten to the magnetic recording medium according to the following criteria:

$b_i'=b_i-T$ when $b_i$ is greater than the first threshold T,
$b_i'=0$ when $b_i$ is less than or equal to the first threshold T.

The foregoing method enables, for example, tape drive operation at lower SNR and/or reduced rewrite area using techniques described herein. In either or both cases, the amount of data storable on a medium is increased.

A computer program product, according to one aspect of the present invention, includes a computer readable storage medium having program instructions embodied therewith, the program instructions executable by an apparatus to cause the apparatus to perform the foregoing method.

An apparatus, according to one aspect of the present invention, includes a controller and logic integrated with the controller, executable by the controller, or integrated with and executable by the controller, the logic being configured to perform the foregoing method.

Any of these approaches may be implemented in a magnetic data storage system such as a tape drive system, which may include a magnetic head, a drive mechanism for passing a magnetic medium (e.g., magnetic tape) over the magnetic head, and a controller electrically coupled to the magnetic head.

Other aspects of the present invention will become apparent from the following detailed description, which, when taken in conjunction with the drawings, illustrate by way of example the principles of the invention.

BRIEF DESCRIPTION OF THE DRAWINGS

FIG. 3 is a partial tape bearing surface view of a magnetic head having a write-read-write configuration.

FIG. 4 is a partial tape bearing surface view of a magnetic head having a read-write-read configuration.

DETAILED DESCRIPTION

Figure 1A:
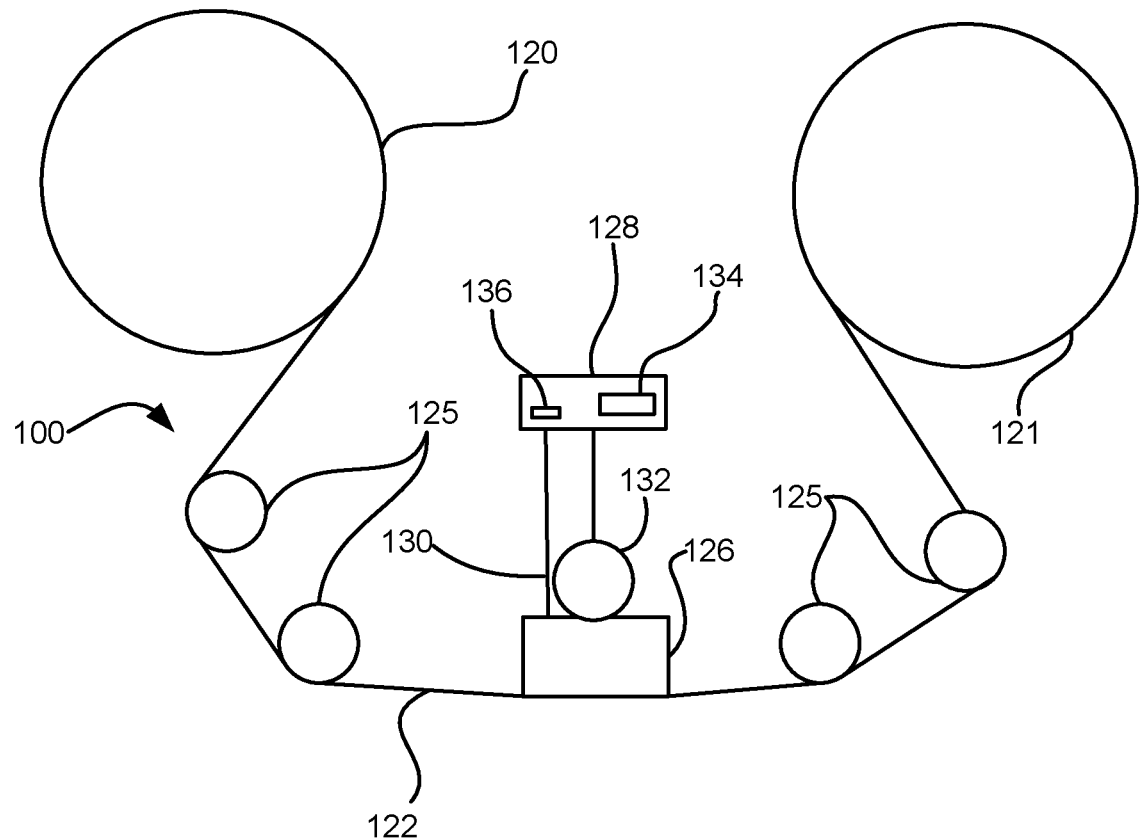
FIG. 1A is a schematic diagram of a simplified tape drive system according to one approach.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred aspects of data storage systems, as well as operation and/or component parts thereof. Various aspects of the present invention enable: 1) an increase of the bit error rate at the C1 decoder input allowing operation at lower SNR without increasing the average rewrite area; 2) a reduction of the rewrite area reserved on tape without decreasing SNR at the operating point; or 3) a combination thereof.

In one general approach, a computer-implemented method includes determining a first threshold T and a second threshold r for a rewrite condition. The first threshold T is greater than zero, and the second threshold r is greater than or equal to zero. Codeword interleaves (CWIs) in a data set are written onto a plurality of simultaneously-written parallel tracks of a magnetic recording medium, where the data set includes a set of S sub-data sets, and where the set of S sub-data sets include a set number of the CWIs where the set number of the CWIs is associated with the length of a C2 code. The CWIs are read immediately after the CWIs are written to the magnetic recording medium. Error correction decoding is performed on the read CWIs, where each CWI includes a set number of C1 or C1' codewords. A determination is made as to whether at least one of the C1 or C1' codewords in each decoded CWI contains more byte errors than the second threshold r of the rewrite condition. For each sub-data set i in the set of S sub-data sets, where i is greater than or equal to 1 and less than or equal to S, a number $b_i$ of the CWIs from sub-data set i, that satisfy the rewrite condition, are inserted into a rewrite buffer. For each sub-data set i in the set of S sub-data sets, where i is greater than or equal to 1 and less than or equal to S, a number $b_i'$ of the $b_i$ CWIs in the rewrite buffer are rewritten to the magnetic recording medium according to the following criteria:
$b_i'=b_i-T$ when $b_i$ is greater than the first threshold T,
$b_i'=0$ when $b_i$ is less than or equal to the first threshold T.

In another general approach, a computer program product includes a computer readable storage medium having program instructions embodied therewith, the program instructions executable by an apparatus to cause the apparatus to perform the foregoing method.

In yet another general approach, an apparatus includes a controller and logic integrated with the controller, executable by the controller, or integrated with and executable by the controller, the logic being configured to perform the foregoing method.

FIG. 1A illustrates a simplified tape drive 100 of a tape-based data storage system, which may be employed in the context of the present invention. While one specific implementation of a tape drive is shown in FIG. 1A, it should be noted that the aspects and approaches described herein may be implemented in the context of any type of tape drive system.

As shown, a tape supply cartridge 120 and a take-up reel 121 are provided to support a tape 122, also known as magnetic tape, magnetic recording tape, tape medium, etc. One or more of the reels may form part of a removable cartridge and are not necessarily part of the tape drive 100. The tape drive, such as that illustrated in FIG. 1A, may further include drive motor(s) to drive the tape supply cartridge 120 and the take-up reel 121 to move the tape 122 over a tape head 126 of any type. Such head may include an array of read transducers (also referred to as readers), write transducers (also known in the art as writers), or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein, in various approaches. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the tape head 126 to be recorded on the tape 122 and to receive data read by the tape head 126 from the tape 122. An actuator 132 controls position of the tape head 126 relative to the tape 122.

An interface 134 may also be provided for communication between the tape drive 100 and a host (internal or external) to send and receive the data and for controlling the operation of the tape drive 100 and communicating the status of the tape drive 100 to the host, all as will be understood by those of skill in the art.

Figure 1B:
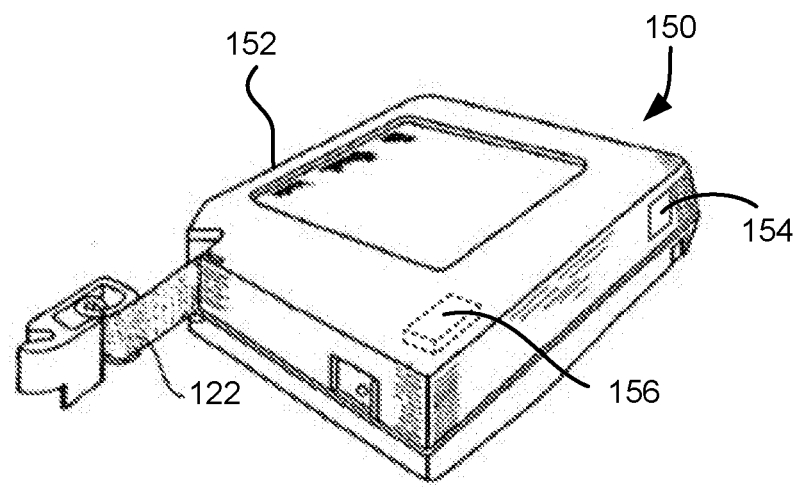
FIG. 1B is a schematic diagram of a tape cartridge according to one approach.

FIG. 1B illustrates an exemplary tape cartridge 150 according to one approach. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred approach, the nonvolatile memory 156 may be a Flash memory device, read-only memory (ROM) device, etc., embedded into or coupled to the inside or outside of the tape cartridge 150. The nonvolatile memory is accessible by the tape drive and the tape operating software (the driver software), and/or another device.

Figure 2A:
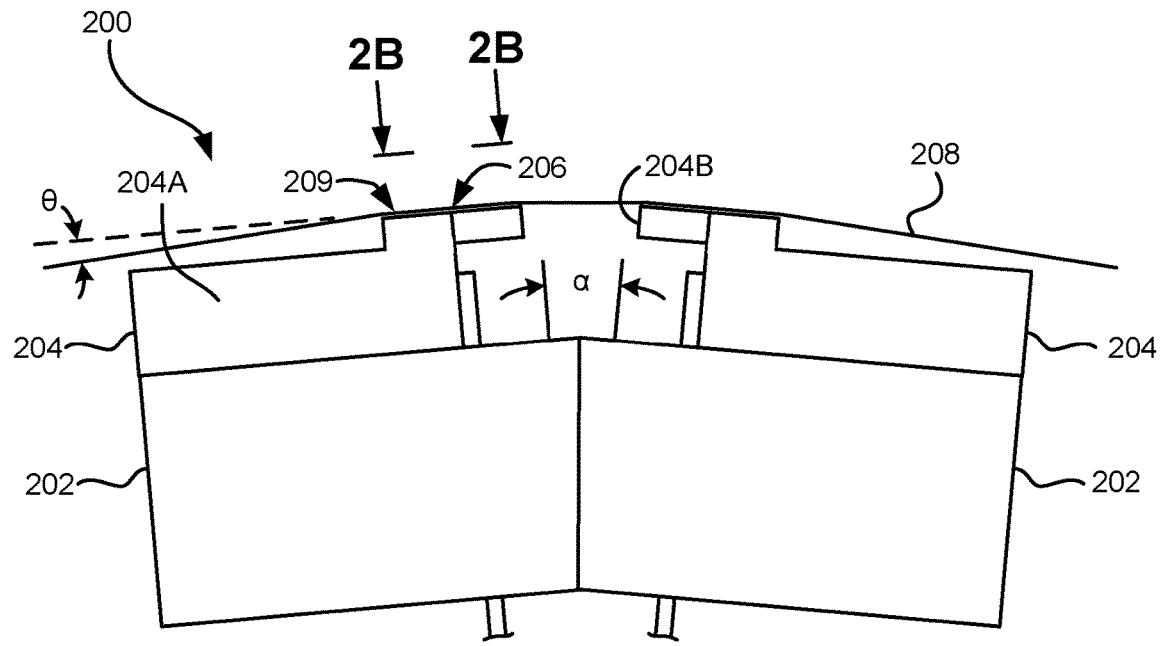
FIG. 2A illustrates a side view of a flat-lapped, bi-directional, two-module magnetic tape head according to one approach.

By way of example, FIG. 2A illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the read transducers and/or write transducers 206 are formed. In use, a tape 208 is moved over the modules 204 along a media (tape) bearing surface 209 in the manner shown for reading and writing data on the tape 208 using the read transducers and write transducers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B may be made of the same or similar ceramic as the substrates 204A.

The read transducers and write transducers may be arranged in a piggyback or merged configuration. An illustrative piggybacked configuration comprises a (magnetically inductive) write transducer on top of (or below) a (magnetically shielded) read transducer (e.g., a magnetoresistive reader, etc.), wherein the poles of the write transducer and the shields of the read transducer are generally separated. An illustrative merged configuration comprises one reader shield in the same physical layer as one writer pole (hence, "merged"). The read transducers and write transducers may also be arranged in an interleaved configuration. Alternatively, each array of channels may be read transducers or write transducers only. Any of these arrays may contain one or more servo readers for reading servo data on the medium.

Figure 2B:
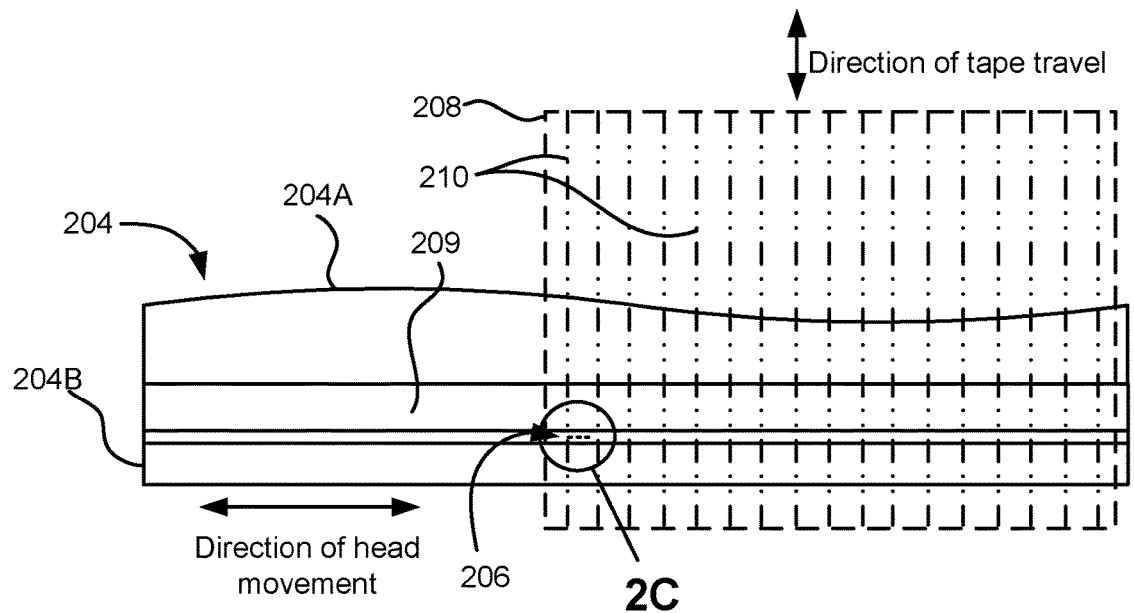
FIG. 2B is a tape bearing surface view taken from Line 2B of FIG. 2A.

FIG. 2B illustrates the tape bearing surface 209 of one of the modules 204 taken from Line 2B of FIG. 2A. A representative tape 208 is shown in dashed lines. The module 204 is preferably long enough to be able to support the tape as the head steps between data bands.

In this example, the tape 208 includes 4 to 32 data bands, e.g., with 16 data bands and 17 servo tracks 210, as shown in FIG. 2B on a one-half inch wide tape 208. The data bands are defined between servo tracks 210. Each data band may include a number of data tracks, for example 1024 data tracks (not shown). During read/write operations, the read transducers and/or write transducers 206 are positioned to specific track positions within one of the data bands. Outer readers, sometimes called servo readers, read the servo tracks 210. The servo signals are in turn used in a conventional manner to keep the read transducers and/or write transducers 206 aligned with a particular set of tracks during the read/write operations.

Figure 2C:
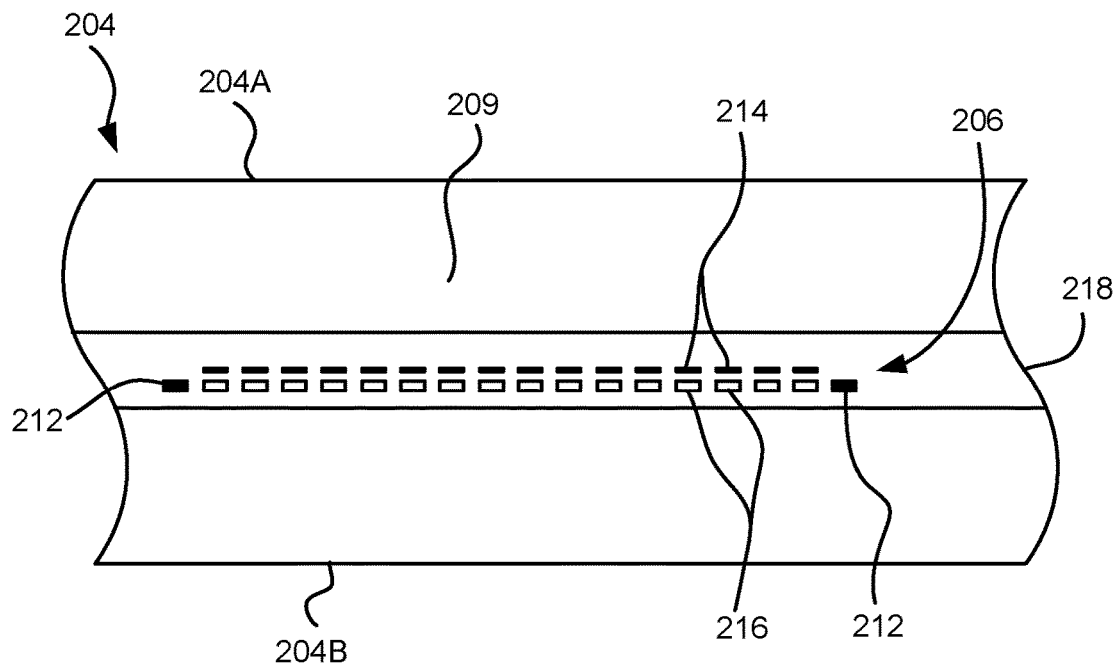
FIG. 2C is a detailed view taken from Circle 2C of FIG. 2B.

FIG. 2C depicts a plurality of read transducers and/or write transducers 206 formed in a gap 218 on the module 204 in Circle 2C of FIG. 2B. As shown in FIG. 2C, the array of read transducers and write transducers 206 includes, for example, 16 write transducers 214, 16 read transducers 216 and two servo readers 212, though the number of elements may vary. Illustrative approaches include 8, 16, 32, 40, and 64 active read transducers and/or write transducers 206 per array, and alternatively interleaved designs having odd numbers of read transducers or write transducers such as 17, 25, 33, etc. An illustrative approach includes 32 read transducers per array and/or 32 write transducers per array, where the actual number of transducer elements could be greater, e.g., 33, 34, etc. Multiple simultaneously-operated transducers allow the tape to travel at a modest velocity while maintaining a high data transfer rate. Lower velocities are desirable to reduce mechanical difficulties from speed-induced tracking.

While the read transducers and write transducers may be arranged in a piggyback configuration as shown in FIG. 2C, the read transducers 216 and write transducers 214 may also be arranged in an interleaved configuration. Alternatively, each array of read transducers and/or write transducers 206 may be read transducers or write transducers only, and the arrays may contain one or more servo readers 212. As noted by considering FIGS. 2A and 2B-2C together, each module 204 may include a complementary set of read transducers and/or write transducers 206 for such things as bi-directional reading and writing, read-while-write capability, backward compatibility, etc.

Figure 2D:
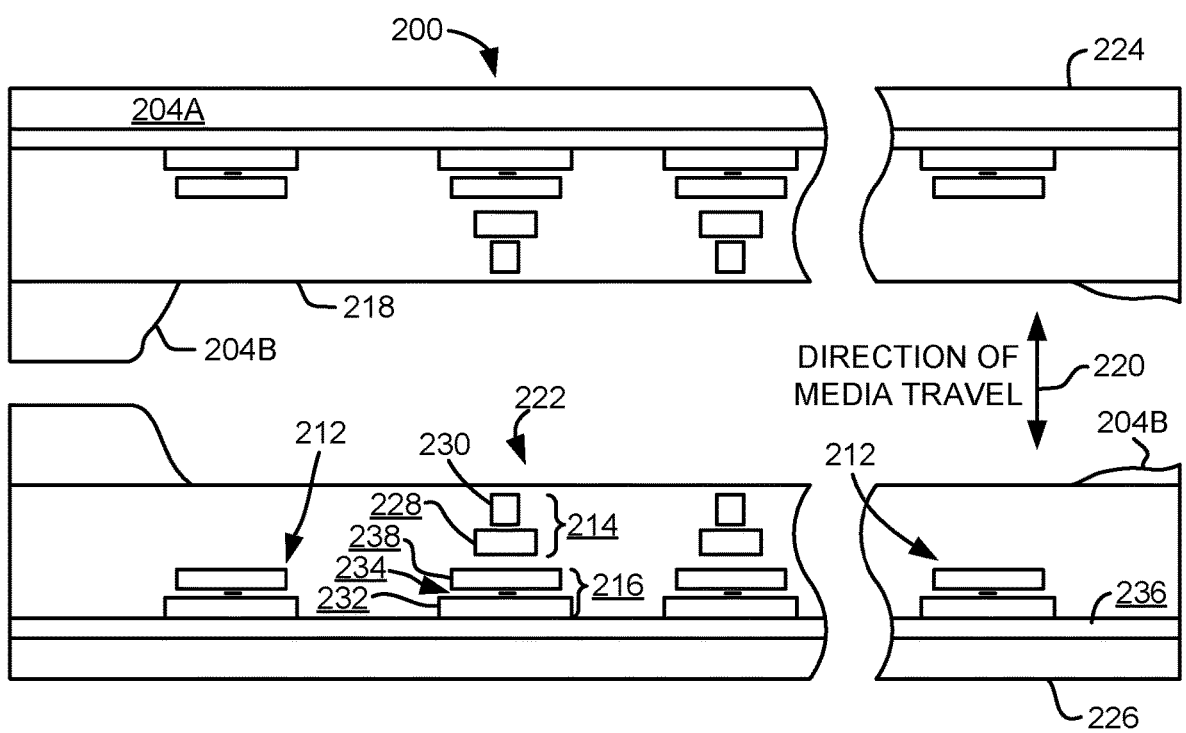
FIG. 2D is a detailed view of a partial tape bearing surface of a pair of modules.

FIG. 2D shows a partial tape bearing surface view of complementary modules of a magnetic tape head 200 according to one approach. In this approach, each module has a plurality of read/write (R/W) pairs in a piggyback configuration formed on a common substrate 204A and an optional electrically insulating layer 236. The write transducers 214 and the read transducers 216 are aligned parallel to an intended direction of travel of a tape medium there across to form an R/W pair, exemplified by R/W pairs 222. Note that the intended direction of tape travel is sometimes referred to herein as the direction of tape travel, and such terms may be used interchangeably. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel there across. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The head assembly 200 includes two thin-film modules 224 and 226 of generally identical construction.

Modules 224 and 226 are joined together with a space present between closures 204B thereof (partially shown) to form a single physical unit to provide read-while-write capability by activating the write transducer of the leading module and read transducer of the trailing module aligned with the write transducer of the leading module parallel to the direction of tape travel relative thereto. When a module 224, 226 of a magnetic tape head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (e.g., ~80/20 at % NiFe, also known as permalloy), cobalt zirconium tantalum (CZT) or Al—Fe—Si (Sendust), a sensor 234 for sensing a data track on a magnetic medium, a second shield 238 typically of a nickel-iron alloy (e.g., permalloy), first and second writer poles 228, 230, and a coil (not shown). The sensor may be of any known type, including those based on magnetoresistive (MR), GMR, AMR, tunneling magnetoresistance (TMR), etc.

The first and second writer poles 228, 230 may be fabricated from high magnetic moment materials such as CoFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

The configuration of the tape head 126 according to one approach includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of write transducers 260. The inner module 254 of FIG. 3 includes one or more arrays of read transducers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify approaches of the present invention. One skilled in the art apprised with the teachings herein will appreciate how permutations of the present invention would apply to configurations other than a W-R-W configuration.

As a tape is run over a module, it is preferred that the tape passes sufficiently close to magnetic transducers on the module such that reading and/or writing is efficiently performed, e.g., with a low error rate.

Magnetic tapes may be stored in tape cartridges that are, in turn, stored at storage slots or the like inside a data storage library. The tape cartridges may be stored in the library such that they are accessible for physical retrieval. In addition to magnetic tapes and tape cartridges, data storage libraries may include data storage drives that store data to, and/or retrieve data from, the magnetic tapes. Moreover, tape libraries and the components included therein may implement a file system which enables access to tape and data stored on the tape.

File systems may be used to control how data is stored in, and retrieved from, memory. Thus, a file system may include the processes and data structures that an operating system uses to keep track of files in memory, e.g., the way the files are organized in memory. Linear Tape File System (LTFS) is an exemplary format of a file system that may be implemented in a given library in order to enables access to compliant tapes. It should be appreciated that various approaches herein can be implemented with a wide range of file system formats, including for example IBM® Spectrum® Archive Library Edition (LTFS LE) (IBM and all IBM—based trademarks and logos are trademarks or registered trademarks of International Business Machines Corporation and/or its affiliates). However, to provide a context, and solely to assist the reader, some of the approaches below may be described with reference to LTFS which is a type of file system format. This has been done by way of example only, and should not be deemed limiting on the invention defined in the claims.

A tape cartridge may be "loaded" by inserting the cartridge into the tape drive, and the tape cartridge may be "unloaded" by removing the tape cartridge from the tape drive. Once loaded in a tape drive, the tape in the cartridge may be "threaded" through the drive by physically pulling the tape (the magnetic recording portion) from the tape cartridge, and passing it above a magnetic head of a tape drive. Furthermore, the tape may be attached on a take-up reel (e.g., see 121 of FIG. 1A above) to move the tape over the magnetic head.

Once threaded in the tape drive, the tape in the cartridge may be "mounted" by reading metadata on a tape and bringing the tape into a state where the LTFS is able to use the tape as a constituent component of a file system. Moreover, in order to "unmount" a tape, metadata is preferably first written on the tape (e.g., as an index), after which the tape may be removed from the state where the LTFS is allowed to use the tape as a constituent component of a file system. Finally, to "unthread" the tape, the tape is unattached from the take-up reel and is physically placed back into the inside of a tape cartridge again. The cartridge may remain loaded in the tape drive even after the tape has been unthreaded, e.g., waiting for another read and/or write request. However, in other instances, the tape cartridge may be unloaded from the tape drive upon the tape being unthreaded, e.g., as described above.

Magnetic tape is a sequential access medium. Thus, new data is written to the tape by appending the data at the end of previously written data. It follows that when data is recorded in a tape having only one partition, metadata (e.g., allocation information) is continuously appended to an end of the previously written data as it frequently updates and is accordingly rewritten to tape. As a result, the rearmost information is read when a tape is first mounted in order to access the most recent copy of the metadata corresponding to the tape. However, this introduces a considerable amount of delay in the process of mounting a given tape.

To overcome this delay caused by single partition tape mediums, the LTFS format includes a tape that is divided into two partitions, which include an index partition and a data partition. The index partition may be configured to record metadata (meta information), e.g., such as file allocation information (Index), while the data partition may be configured to record the body of the data, e.g., the data itself.

Figure 5:
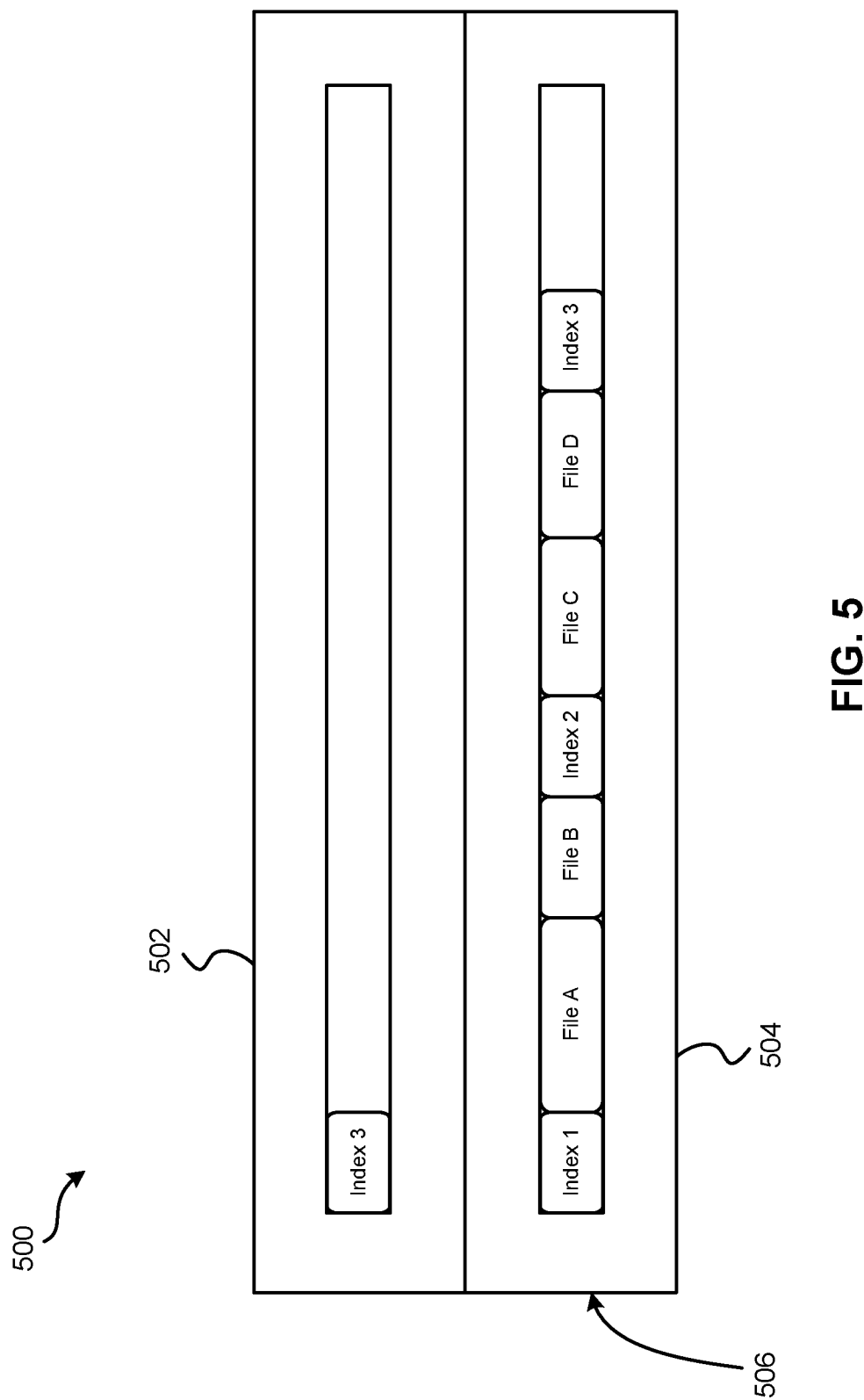
FIG. 5 is a representational diagram of files and indexes stored on a magnetic tape according to one approach.

Looking to FIG. 5, a magnetic tape 500 having an index partition 502 and a data partition 504 is illustrated according to one approach. As shown, data files and indexes are stored on the tape. The LTFS format allows for index information to be recorded in the index partition 502 at the beginning of tape 506, as would be appreciated by one skilled in the art upon reading the present description.

As index information is updated, it preferably overwrites the previous version of the index information, thereby allowing the currently updated index information to be accessible at the beginning of tape in the index partition. According to the specific example illustrated in FIG. 5, a most recent version of metadata Index 3 is recorded in the index partition 502 at the beginning of the tape 506. Conversely, all three version of metadata Index 1, Index 2, Index 3 as well as data File A, File B, File C, File D are recorded in the data partition 504 of the tape. Although Index 1 and Index 2 are old (e.g., outdated) indexes, because information is written to tape by appending it to the end of the previously written data as described above, these old indexes Index 1, Index 2 remain stored on the tape 500 in the data partition 504 without being overwritten.

The metadata may be updated in the index partition 502 and/or the data partition 504 the same or differently depending on the desired approach. According to some approaches, the metadata of the index and/or data partitions 502, 504 may be updated in response to the tape being unmounted, e.g., such that the index may be read quickly from the index partition when that tape is mounted again. The metadata is preferably also written in the data partition 504 so the tape may be mounted using the metadata recorded in the data partition 504, e.g., as a backup option.

According to one example, which is no way intended to limit the invention, LTFS LE may be used to provide the functionality of writing an index in the data partition when a user explicitly instructs the system to do so, or at a time designated by a predetermined period which may be set by the user, e.g., such that data loss in the event of sudden power stoppage can be mitigated.

Figure 6:
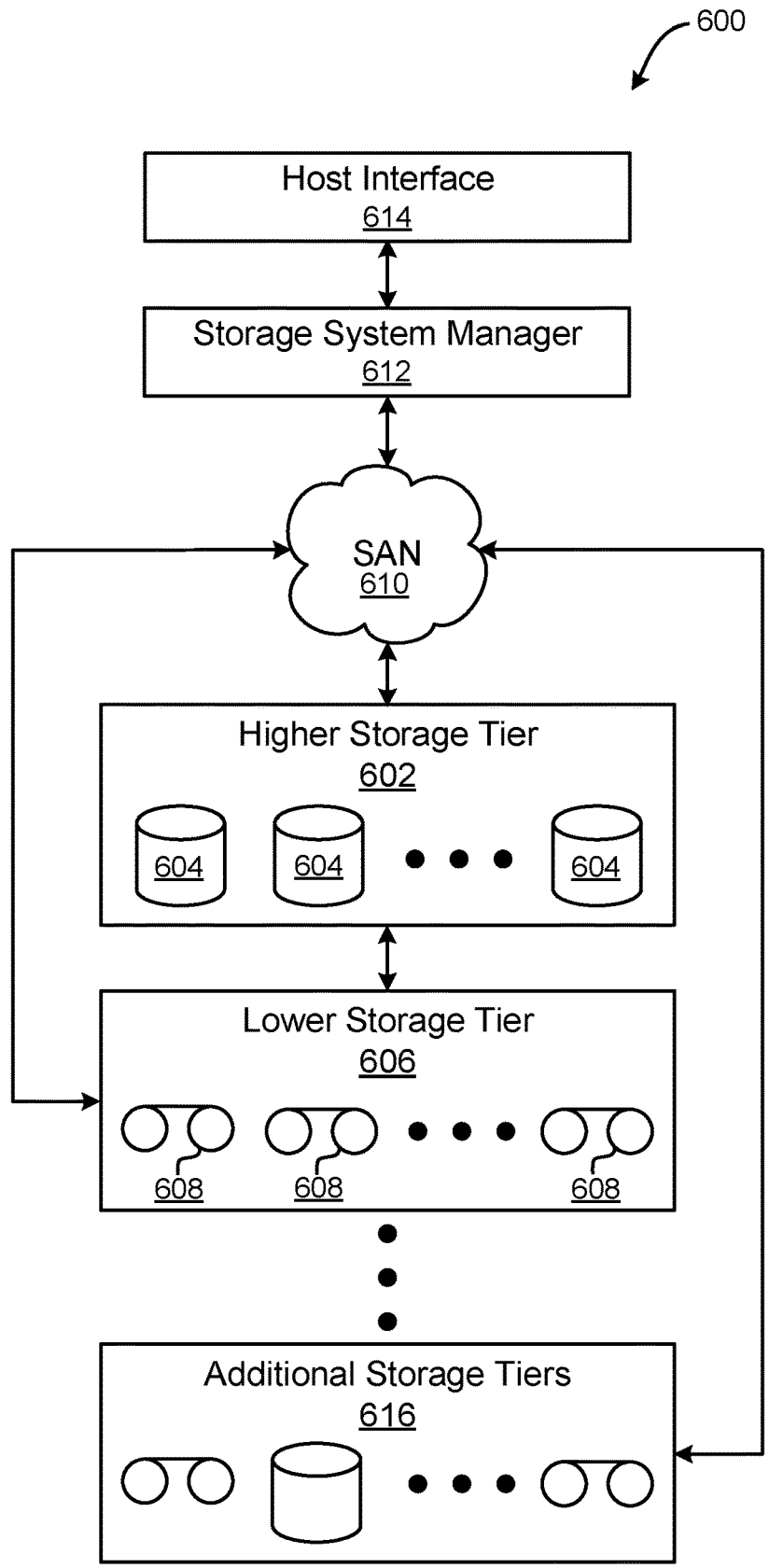
FIG. 6 is a diagram of a tiered data storage system, in accordance with one approach of the present invention.

Now referring to FIG. 6, a storage system 600 is shown according to one approach. Note that some of the elements shown in FIG. 6 may be implemented as hardware and/or software, according to various approaches. The storage system 600 may include a storage system manager 612 for communicating with a plurality of media and/or drives on at least one higher storage tier 602 and at least one lower storage tier 606. The higher storage tier(s) 602 preferably may include one or more random access and/or direct access media 604, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 606 may preferably include one or more lower performing storage media 608, including sequential access media such as magnetic tape in tape drives and/or optical media, slower accessing HDDs, slower accessing SSDs, etc., and/or others noted herein or known in the art. One or more additional storage tiers 616 may include any combination of storage memory media as desired by a designer of the system 600. Also, any of the higher storage tiers 602 and/or the lower storage tiers 606 may include some combination of storage devices and/or storage media.

The storage system manager 612 may communicate with the drives and/or storage media 604, 608 on the higher storage tier(s) 602 and lower storage tier(s) 606 through a network 610, such as a storage area network (SAN), as shown in FIG. 6, or some other suitable network type. The storage system manager 612 may also communicate with one or more host systems (not shown) through a host interface 614, which may or may not be a part of the storage system manager 612. The storage system manager 612 and/or any other component of the storage system 600 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more approaches, the storage system 600 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 602, may include a majority of SSD storage media for storing data in a higher performing storage environment, and remaining storage tiers, including lower storage tier 606 and additional storage tiers 616 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 602, while data not having one of these attributes may be stored to the additional storage tiers 616, including lower storage tier 606. Of course, one of skill in the art, upon reading the present descriptions, may devise many other combinations of storage media types to implement into different storage schemes, according to the approaches presented herein.

According to some approaches, the storage system (such as 600) may include logic configured to receive a request to open a data set, logic configured to determine if the requested data set is stored to a lower storage tier 606 of a tiered data storage system 600 in multiple associated portions, logic configured to move each associated portion of the requested data set to a higher storage tier 602 of the tiered data storage system 600, and logic configured to assemble the requested data set on the higher storage tier 602 of the tiered data storage system 600 from the associated portions.

Of course, this logic may be implemented as a method on any device and/or system or as a computer program product, according to various approaches.

As noted above, various aspects of the present invention enable: 1) an increase of the bit error rate at the C1 decoder input allowing operation at lower SNR without increasing the average rewrite area; 2) a reduction of the rewrite area reserved on tape without decreasing SNR at the operating point; or 3) a combination thereof.

Figure 7:
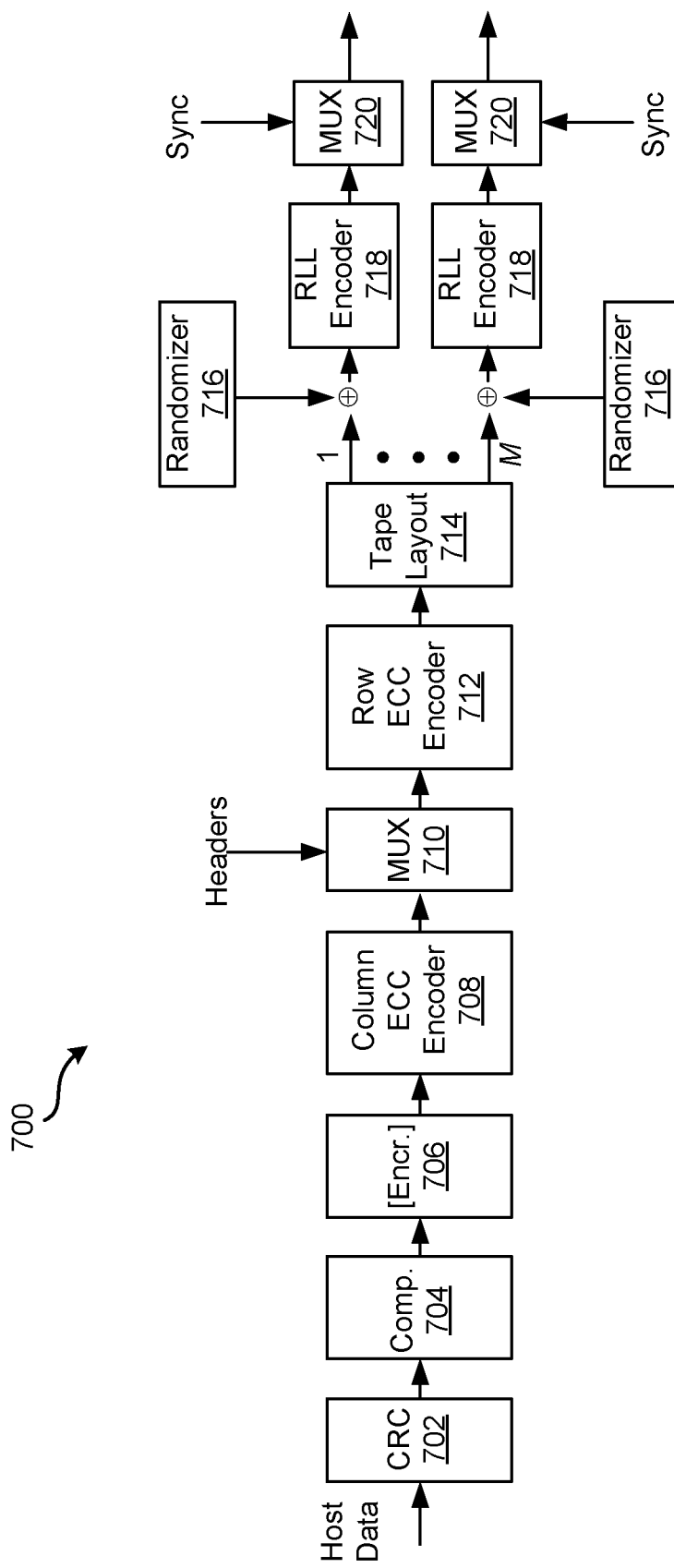
FIG. 7 is a high-level block diagram showing one example of a data flow for a tape drive, in accordance with one aspect of the present invention.

Referring to FIG. 7, a high-level block diagram showing one exemplary data flow 700 for a tape drive is illustrated. This data flow 700 is presented only by way of example and is not intended to be limiting. Indeed, tape drives implementing other data flows may also benefit from the rewrite techniques disclosed herein and thus are intended to be encompassed within the scope of the invention. The data flow 700 is simply presented to show one approach to performing a process for recording data to magnetic tape. Moreover, except as otherwise described herein according to the various novel aspects of the present invention, each module in the data flow 700 may function in a conventional manner.

As shown in FIG. 7, a CRC module 702 receives a sequence of bytes contained within variable-length blocks of data (also known as "records") from a host device. These blocks of data may be any size up to a maximum size supported by a tape drive. The cyclic redundancy check (CRC) module 702 may add CRC information to these blocks. A compression module 704 may then compress the blocks and an encryption module 706 may optionally encrypt the blocks. The blocks of data may then be broken into data sets of fixed size, which may in turn be broken into sub data sets (SDSs) of fixed size. Each SDS may be organized into a two-dimensional array of data and passed to a column error correction coding (ECC) encoder 708, which in turn generates ECC parity for each column in the data array and appends the column ECC parity to the array.

Once the column ECC parity is generated and appended to the array, a multiplexer 710 may append headers to the rows in the array. These headers may identify the location of the rows within the sub data set and larger data set in which they reside. The extended array may then be passed to a row ECC encoder 712 which generates row ECC parity (containing typically 8-bit symbols (byte), etc.) for each row in the array. In general, ECC parity symbols have n bits where n is a positive integer number. The ECC parity may be of any conventional type, e.g., C1 parity, C1' parity, etc., where C1 parity is generated from a row of an SDS and C1' parity is generated from both a row of an SDS and a header appended to the row. Therefore, C1 parity protects against faults in a row of an SDS whereas C1' parity protects against faults both in a row of an SDS and a header appended to the row. A tape layout module 714 may then distribute the data array, the ECC parity, and the headers across M different tracks and in different orders for recording on the magnetic tape. M is typically a multiple of 8 such as 8, 16, 32, 64 etc. In general, M can be any positive integer number. The data sequences may then be processed by randomizers 716 which perform additional signal processing on the data in a conventional manner. Run length limited (RLL) encoders 718 may then transform the information so that it is better suited for magnetic recording. Multiplexers 720 may multiplex synchronization information, such as a variable frequency oscillator (VFO) sequence for timing acquisition, sync characters, or the like, into the information to enable it to be synchronized when read. The resulting data may then be sent to write drivers (not shown) which causes current to flow through recording head elements to generate magnetic flux and thereby write the data to the magnetic recording medium. In general, each of the blocks or modules to the right of the row ECC encoder 712 perform different transformations on the data to make it more suitable for magnetic recording.

Figure 8:
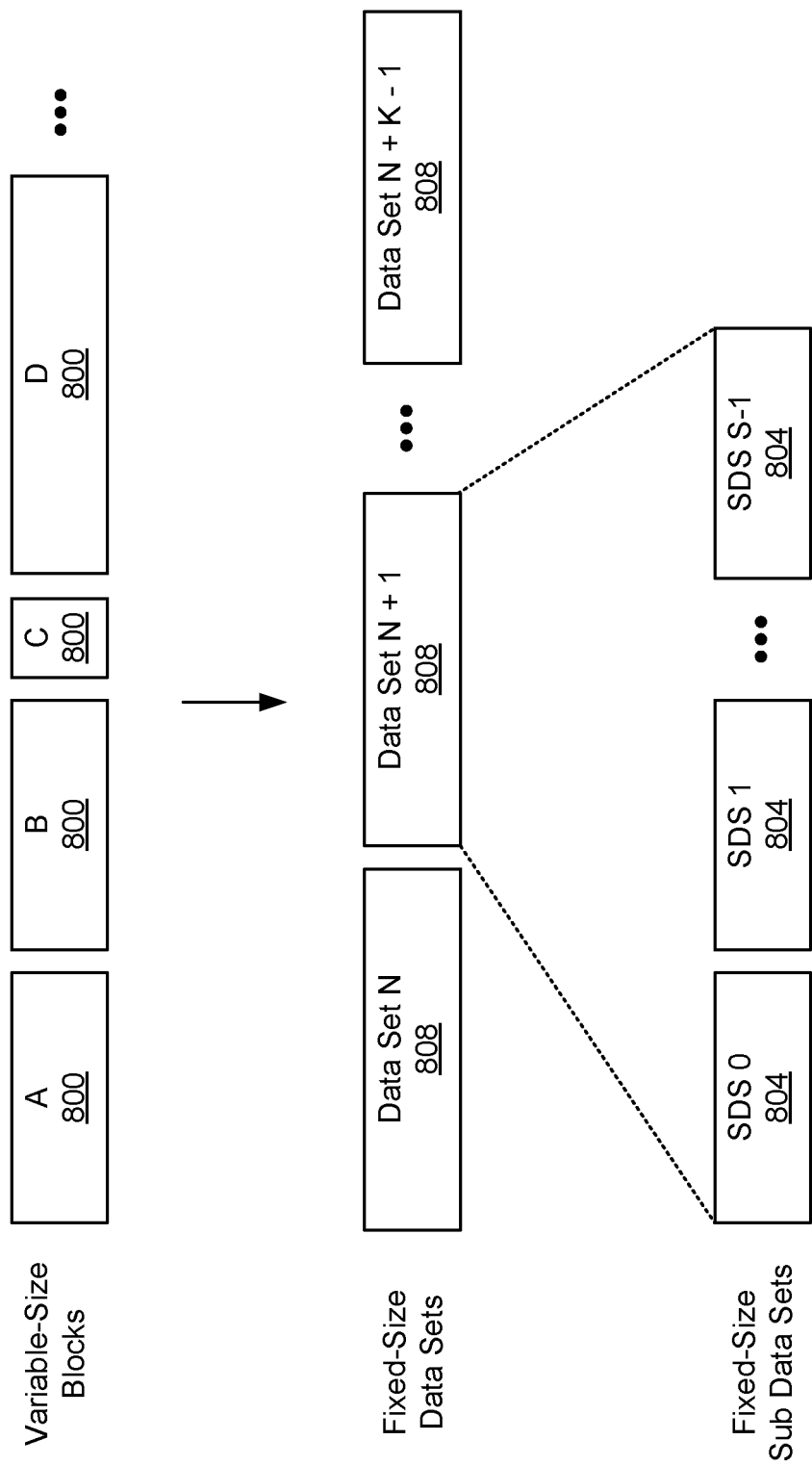
FIG. 8 is a high-level block diagram showing variable-sized blocks of data from a host broken into fixed-sized data sets, and then into smaller fixed-size sub data sets, in accordance with one aspect of the present invention.

Referring to FIG. 8, as explained above, a tape drive may be configured to allocate incoming variable-length blocks of data into data sets 808 of fixed size prior to recording the data on tape. The number of bytes in a data set 808 is typically drive-technology-dependent and is not visible to the host. The incoming host data begins filling the first data set 808 at the first byte of the data set 808 and continues to the last byte of the data set 808, then into subsequent data sets 808, as needed. In certain cases, tape drives may combine multiple small host records 800 into a single data set 808, or may generate multiple data sets 808 from large host records 800. As explained above, each data set 808 interleaves some number S of smaller fixed-size data entities referred to as sub data sets 804 (SDSs) in order to improve the performance of the ECC decoder.

Figure 9:
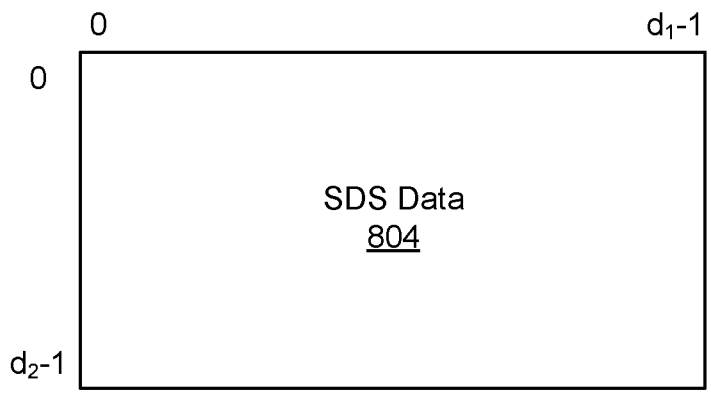
FIG. 9 is a high-level block diagram showing the data of a sub data set (SDS) organized into a two-dimensional data array, in accordance with one aspect of the present invention.

Referring to FIG. 9, a high-level block diagram of a sub data set (SDS) 804 is illustrated. As shown, the SDS 804 is organized into a matrix of $d_2$ rows and $d_1$ columns. The data from a data set 808 may fill the SDS 804 row by row, beginning at row 0, byte 0, and continuing through row $d_2$-1, byte $d_1$-1.

Figure 10:
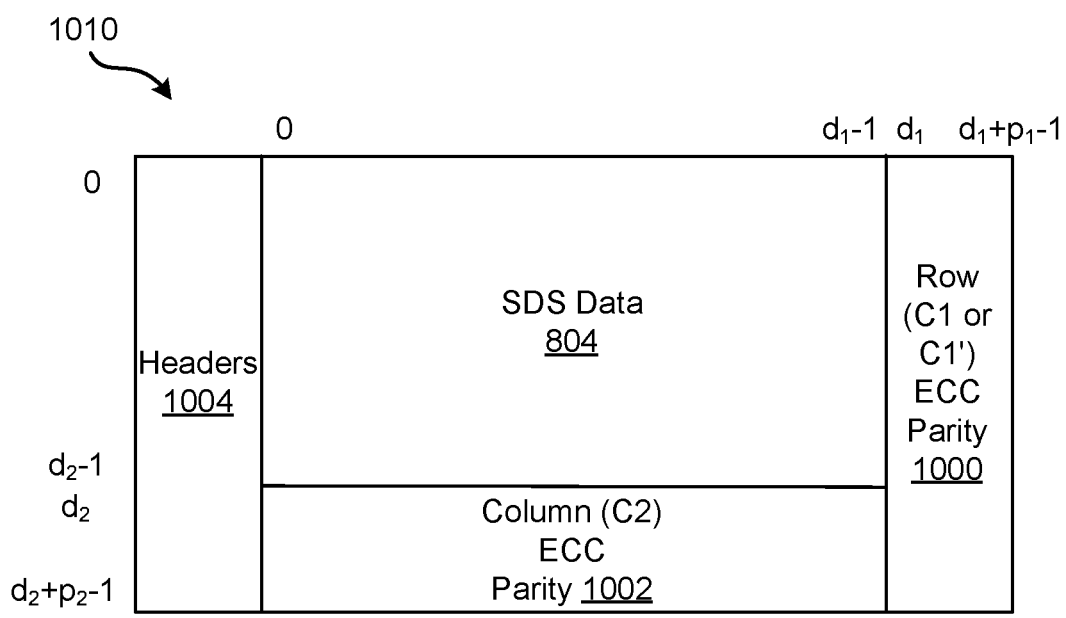
FIG. 10 is a high-level block diagram showing ECC codes appended to the SDS data array of FIG. 9, where each row of the extended ECC-protected data array is a codeword interleave (CWI), in accordance with one aspect of the present invention.

As shown in FIG. 10, $p_2$ column ECC parity bytes 1002 (also known as "C2" parity) are added to each column in the SDS array 804, and after appending headers 1004 to each row, $p_1$ row ECC parity bytes 1000 (also known as C1 parity or C1' parity) are added to each row in the SDS array 804.

C1 parity is generated from a row of an SDS whereas C1' parity is generated from both a row of an SDS and a header appended to the row. The row ECC parity 1000 protects each row of the SDS array 804 while the column ECC parity 1002 protects each column in the SDS array 804 with the exception of the appended header part 1004. Each SDS row, including the rows of column ECC parity data 1002, may be considered a C1 codeword. In selected approaches, the row ECC parity 1000 and/or column ECC parity 1002 are made up of Reed-Solomon codes.

In some approaches, each row contains multiple C1 codewords interleaved in some manner. Thus, for the purposes of this description, each row of the ECC-protected SDS array 1010 will be referred to hereinafter as a codeword interleave (CWI), where the CWI 1100 includes at least one codeword. Each column of the ECC-protected SDS array 1010 may be referred to as a C2 codeword. Each SDS 804 is an independent ECC-protected entity, meaning that the C1 ECC parity 1000 and the C2 ECC parity 1002 for an SDS 804 protects that SDS 804 only. A data set 808 comprises S SDSs 804, each of which contains $N=d_2+p_2$ CWIs 1100. Thus, the number of CWIs 1100 in a data set 808 is $Q=N\times S$.

Figure 11:
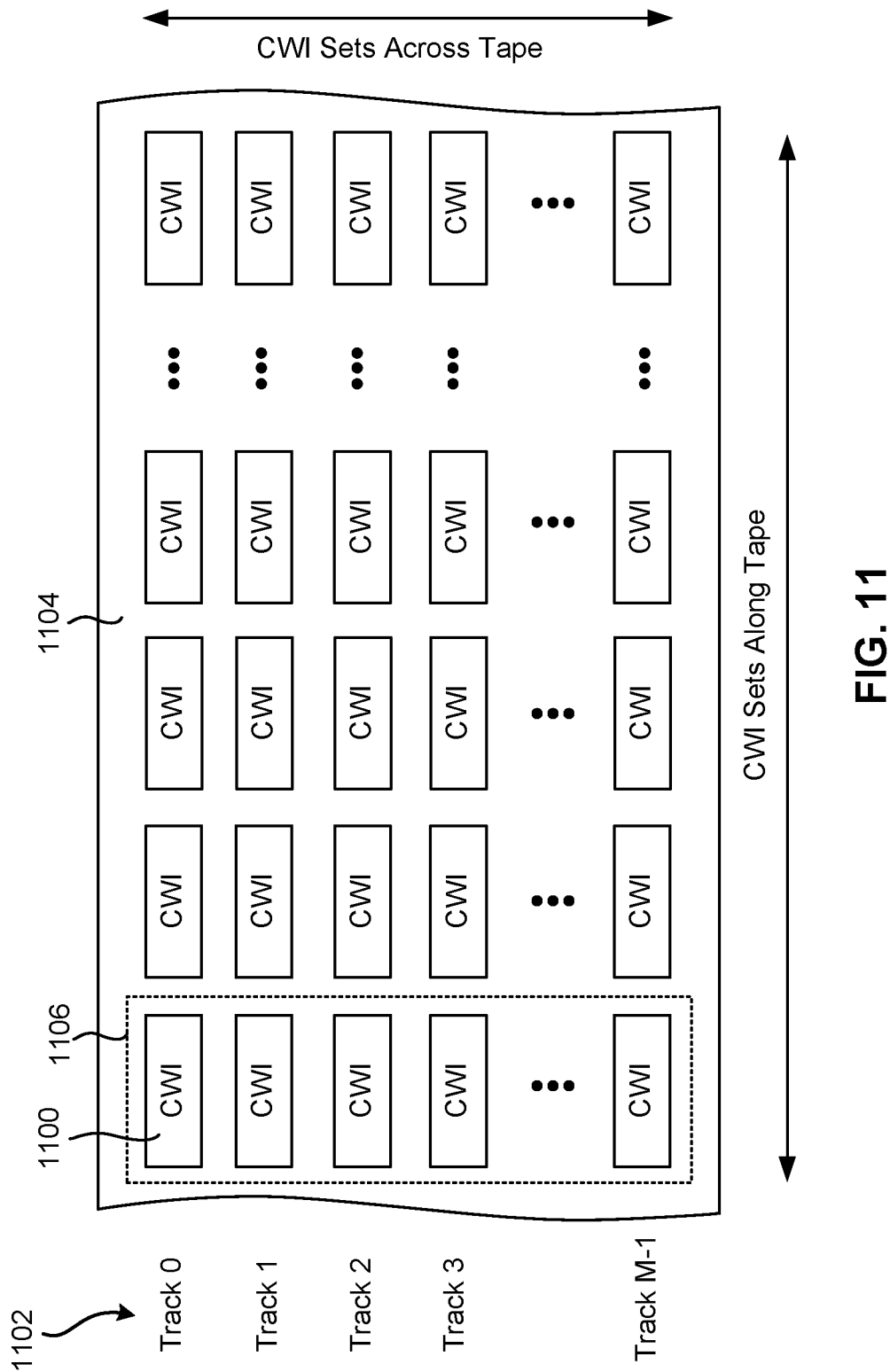
FIG. 11 is a high-level block diagram showing one example of a technique for laying out CWIs on magnetic tape, in accordance with one aspect of the present invention.

Referring to FIG. 11, a high-level block diagram showing one example of a technique for laying out CWIs 1100 on magnetic tape 1104 is illustrated. In general, most tape drives read and/or write multiple longitudinal tracks 1102 (e.g., 8, 16, or 32 tracks) on magnetic tape 1104 simultaneously. In doing so, the CWIs 1100 of a data set 808 are written onto the tape 1104. For a recording format with M simultaneously recorded tracks 1102, M CWIs 1100 are written simultaneously, one CWI 1100 per track 1102. The group of simultaneously written CWIs 1100 is referred to herein as a CWI set 1106. As the tape head moves along the magnetic tape 1104, CWI sets 1106 are read from or written to the tape 1104.

To ensure good performance of the C2 ECC parity 1002, the CWIs 1100 from the same SDS 804 should be spaced apart from one another in the tape layout of the data set 808. The physical distribution of the CWIs 1100 from each SDS 804 will ideally decorrelate error locations on the magnetic tape 1104 from the error locations within each SDS 804. The spacing property is preferably maintained as much as possible during rewrites and may be particularly important if a relatively large part of the data is rewritten, such as occurs with a dead track.

Figure 12:
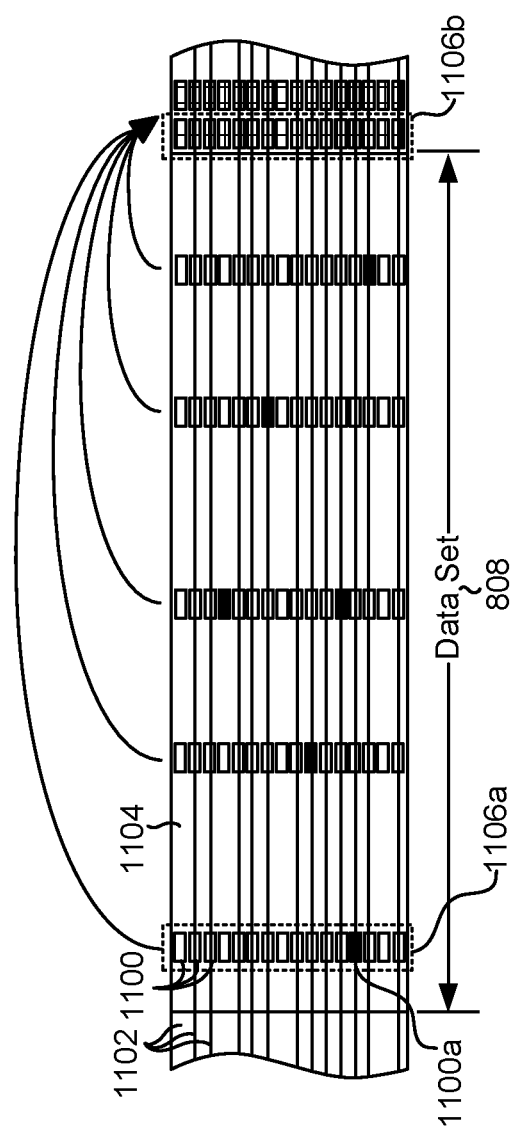
FIG. 12 is a high-level block diagram showing an improved technique for rewriting data on magnetic tape, in accordance with one aspect of the present invention.

Referring to FIG. 12, a high-level block diagram showing a technique for rewriting data on magnetic tape 1104 is illustrated. This technique enables: 1) an increase of the bit error rate at the C1 decoder input allowing operation at lower SNR without increasing the average rewrite area; 2) a reduction of the rewrite area reserved on tape without decreasing SNR at the operating point; or 3) a combination thereof.

With continued reference to FIG. 12, instead of rewriting an entire CWI set 1106*b* within a short distance from an initial CWI set 1106*a* where a faulty CWI 1100*a* is detected, the improved rewrite technique identifies faulty CWIs 1100 in the data set 808 in a conventional manner, and then rewrites a select number of the faulty CWIs in one or more CWI sets 1106*b* at the end of the data set 808 in parallel tracks 1102. Using this technique, the number of faulty CWIs 1100 created at the end of the data set 808 is controlled to the aforementioned benefits. The rewriting may also be performed in such a way that it preserves a predetermined minimum spacing between CWIs 1100 on magnetic tape 1104 that are from the same SDS 804. This may be accomplished using conventional rewrite tables for rewriting the faulty CWIs 1100 at the end of a data set 808. Rewrite tables assist in ensuring that a minimum spacing is maintained between CWIs 1100 from the same SDS 804 on magnetic tape 1104, thereby providing good ECC performance for the rewritten CWIs 1100.

Figure 13:
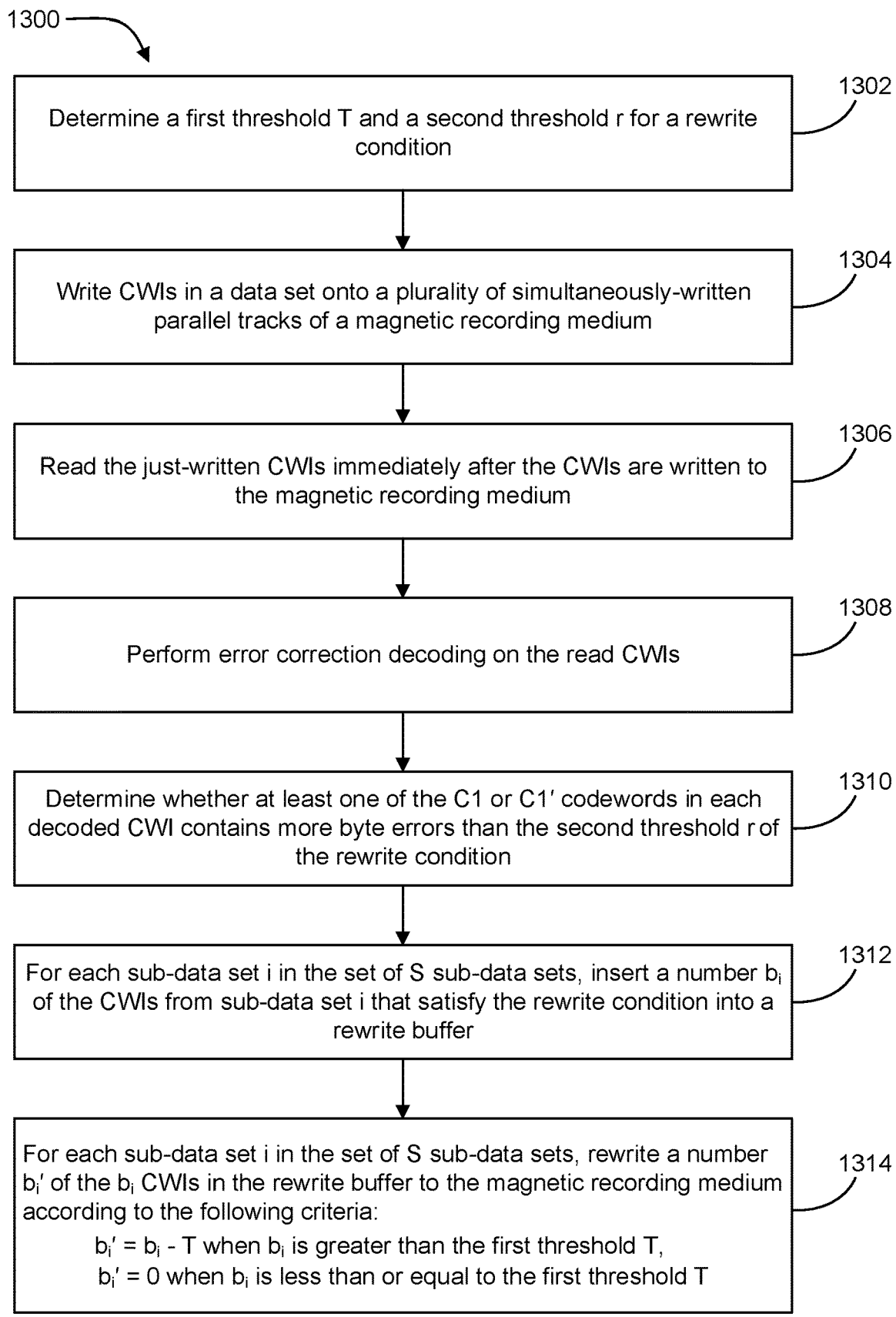
FIG. 13 is a flow diagram of a process for writing data using a threshold-based rewrite scheme, in accordance with one aspect of the present invention

Referring to FIG. 13, a method 1300 for writing data using a threshold-based rewrite scheme is illustrated. The method 1300 may be performed in accordance with the present invention in any of the environments depicted in FIGS. 1-12 and 14, among others, in various approaches. Of course, more or fewer operations than those specifically described in FIG. 13 may be included in method 1300, as would be understood by one of skill in the art upon reading the present descriptions.

Each of the steps of the method 1300 may be performed by any suitable component of the operating environment. For example, in various approaches, the method 1300 may be partially or entirely performed by a tape drive. In other approaches, the method 1300 is partially or entirely performed by a cloud drive.

In operation 1302, a first threshold T and a second threshold r for a rewrite condition are determined.

The first threshold T corresponds to an error correction capability, e.g., of the drive according to the configuration of the drive, of the particular ECC encoding scheme used, as specified in a data format, etc. The first threshold T is greater than zero.

The second threshold r corresponds to a raw bit error rate of a drive performing the method, e.g., according to the configuration of the drive. The second threshold r is greater than or equal to zero.

The thresholds may be determined from any source. For example, one or both thresholds may be determined from default configuration data, e.g., from configuration information of the drive. In another approach, one or both thresholds may be determined from a configurable setting, e.g., as set by a user, by a computer, etc. In yet another approach, one or both thresholds may be received during operation of the drive, e.g., from a user, from a configuration file, etc.

A benefit of the methodology described herein is that the threshold condition can be adjusted, e.g., during operation of the drive, at any time, upon occurrence of a trigger condition, upon receipt of user input specifying the adjustment, etc.

In one approach, the allowed adjustment includes adjusting the rewrite condition to increase a raw bit error rate of a drive without adjusting a size of a designated rewrite area.

In another approach, the allowed adjustment includes reducing a size of a designated rewrite area without adjusting a current raw bit error rate of the drive.

In a further approach, the rewrite condition is dynamically adjusted to: at least once, increase a raw bit error rate of the drive without adjusting a size of a designated rewrite area; and at least once, reduce a size of a designated rewrite area without adjusting a current raw bit error rate of the drive.

In operation 1304, CWIs in a data set are written onto M simultaneously-written parallel tracks of a magnetic recording medium such as magnetic tape or magnetic disk, (e.g., where M=8, 16, 32, 64 tracks). The data set includes a set of S SDSs. The set of S SDSs include a set number of the CWIs where the set number of the CWIs is associated with the length of a C2 code. For example, each SDS may include N2 CWIs, where N2 is the length of the C2 code. Preferably, the CWIs are written onto M parallel tracks using M write transducers.

In operation 1306, the just-written CWIs are read immediately after the CWIs are written to the magnetic recording medium, e.g., as in a typical read-while-write process.

In operation 1308, error correction decoding is performed on the read CWIs, where each CWI includes a set number of C1 or C1' codewords. This operation 1308 preferably includes at least C1 or C1' decoding.

In operation 1310, a determination is made as to whether at least one of the C1 or C1' codewords in each decoded CWI contains more byte errors than the second threshold r of the rewrite condition.

In operation 1312, for each sub-data set i in the set of S sub-data sets, where i is greater than or equal to 1 and less than or equal to S, a number $b_i$ of the CWIs from sub-data set i, that satisfy the rewrite condition, are inserted into a rewrite buffer. More discussion about rewrite buffers is presented below with reference to FIG. 14.

In operation 1314, for each sub-data set i in the set of S sub-data sets, where i is greater than or equal to 1 and less than or equal to S, a number $b_i'$ of the $b_i$ CWIs in the rewrite buffer are rewritten to the magnetic recording medium according to the following criteria:

$b_i'=b_i-T$ when $b_i$ is greater than the first threshold T,
$b_i'=0$ when $b_i$ is less than or equal to the first threshold T.

As evident from the criteria immediately above, up to T faulty CWIs are not rewritten when operation 1314 is performed. Moreover, if $b_i$ is less than or equal to T, no CWIs are rewritten.

The method 1300 enables an increase in the amount of user data storable on a medium. For example, using the method 1300, linear and/or lateral data density can be increased, which results in a corresponding decrease in SNR. A lower SNR tends to result in more errors, resulting in more CWIs failing the rewrite condition. However, in some approaches presented herein, the number of rewrites is reduced in spite of the lower SNR, avoiding the need to dedicate more media space for rewrites due to the higher data density. In other approaches, the SNR may be maintained, but the dedicated rewrite area may be reduced in size by up to the amount of data corresponding to the CWIs failing the rewrite condition that are not rewritten, thereby providing more space for user data.

Figure 14:
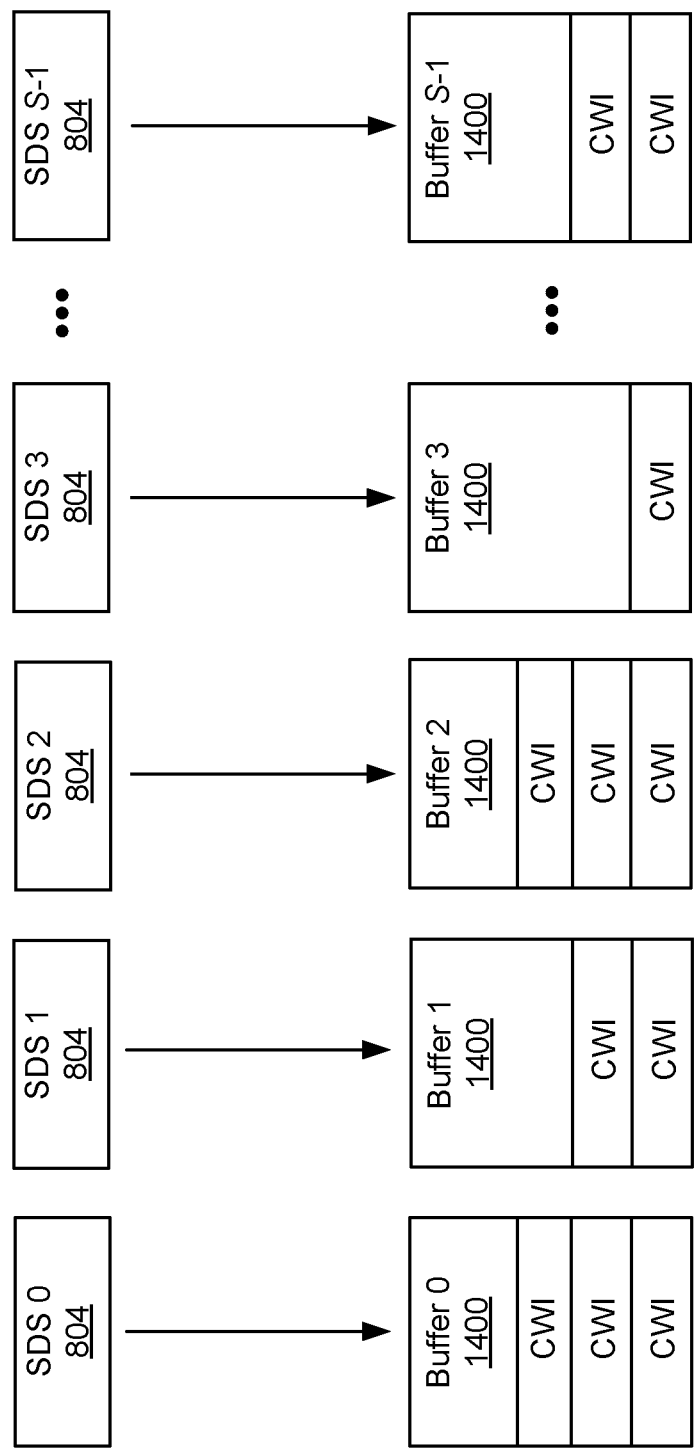
FIG. 14 is a high-level block diagram showing various buffers used to record faulty CWIs from the SDSs of a data set, where the number of buffers is equal to the number of SDSs, in accordance with one aspect of the present invention.

Referring to FIG. 14, in order to provide the benefits described above in association with FIG. 12, the improved rewrite technique may utilize a number of buffers 1400, such as a number of first-in/first-out (FIFO) buffers 1400. In selected approaches, the rewrite technique utilizes S buffers 1400, namely one buffer 1400 per SDS 804 in a data set 808. In other approaches, other numbers of buffers 1400, such as S/2 or S/4 buffers 1400, may be utilized.

During the read-while-write process of a data set 808 with S SDSs 804, the faulty CWIs 1100 from the S SDSs 804 may be assigned to the S buffers 1400. More specifically, a faulty CWI 1100 that belongs to an SDS 804 number s, where 0≤s<S, may be assigned to the $s^{th}$ buffer 1400. Thus, a faulty CWI from SDS 0 may be assigned to Buffer 0, a faulty CWI from SDS 1 may be assigned to Buffer 1, a faulty CWI from SDS 2 may be assigned to Buffer 2, and so forth. This will allow all of the faulty CWIs 1100 from the data set 808 to accumulate in the various buffers 1400. Since the number of errors that occur in each SDS 804 may differ, the number of faulty CWIs 1100 that are recorded in each buffer 1400 may also differ, as illustrated in FIG. 14.

Once the end of the data set 808 is reached, the selected number $b_i'$ of CWIs 1100 identified in the buffers 1400 may be rewritten at the end of the data set 808, e.g., in accordance with a rewrite table in a known manner. These rewrite table may be designed to ensure that faulty CWIs 1100 from the same SDS 804 are sufficiently spaced apart on magnetic tape to maintain good ECC performance.

If, during rewriting and the continuing read-while-write operation, a rewritten CWI 1100 is detected as faulty, it may be rewritten another time. In one approach, the faulty rewritten CWIs 1100 may be rewritten until they satisfy the rewrite condition. In another approach, only some of the faulty rewritten CWIs 1100, i.e. not all faulty rewritten CWIs, may be rewritten according to a specified rule.

If a buffer 1400 runs out of data during the rewrite, a CWI 1100 may be selected from another non-empty buffer 1400 in accordance with a predetermined fill policy. Alternatively, dummy data or no data at all may be written to tape 1104 when a buffer 1400 runs out of data and other buffers 1400 are still not empty. Other fill policies are possible and within the scope of the invention.

In certain approaches (not shown), a single buffer 1400 may be used to store faulty CWIs 1100 from all SDSs 804 in a data set 808. In such an approach, the faulty CWIs 1100 may be rewritten out of the single buffer 1400 in batches, e.g., of M=16 or M=32, depending on the number of simultaneously written tracks M. If the number of rewrites is not a multiple of M, the last batch may contain multiple instances of certain CWIs 1100 to generate a CWI set 1106 with M CWIs 1100. The manner in which the CWIs 1100 are repeated in the last batch may be established by a predetermined fill policy.

Where several CWIs from different sub-data sets are rewritten, the CWIs from the various sub-data sets are preferably written next to each other on all tracks, e.g., by interleaving the rewritten CWIs from the various sub-data sets. The rewrite scheme determines on which tracks CWIs from different sub-data sets are rewritten. In general, it is beneficial to separate rewritten CWIs from the same sub-data set as much as possible from each other in both dimensions on tape, i.e. along a track and across tracks. However, if rewritten CWIs from the same sub-data set are separated too much from each other on tape, the rewrite area increases, i.e., rewriting becomes inefficient. Conversely, if the rewritten CWIs are too close to each other on tape, the interleaving of rewritten CWIs is not good and the error correction coding scheme may not be able to correct certain types of burst errors (error correction decoder can decode data reliably after reading a sub-data set including written and rewritten CWIs from the same sub-data set). In other words, the rewrite scheme preferably provides a trade-off between high rewrite efficiency (i.e. small rewrite area) and high robustness to burst errors (i.e. high depth of interleaving of rewritten CWIs).

The methodology corresponding to method 1300 of FIG. 13 provides several benefits.

The threshold rewriting scheme enables prevention of rewriting of up to a threshold T of CWIs per SDS.

A drive implementing the methodology can operate when the bit error rate at the C1 or C1' decoder input is increased by about one order without degrading the rewrite performance. Therefore, the methodology disclosed herein enables operation at lower SNR without increasing the average rewrite area. Alternatively, the methodology may be used to reduce the reserved rewrite area on tape, especially if the SNR at the operating point is not reduced.

Thus, a benefit of the methodology described herein is that the threshold condition can be adjusted to provide the particular benefit sought, whether that benefit is adjusting the rewrite condition to increase a raw bit error rate of a drive without adjusting a size of a designated rewrite area, reducing a size of a designated rewrite area without adjusting a current raw bit error rate of the drive, or both.

In a cloud drive, the methodology presented herein enables a host to control the amount of rewrite and/or dynamically adjust the rewrite scheme on-the-fly including turning the rewrite scheme off in the extreme case of T=N2, e.g., if N2=96, and T is set to 96, nothing is rewritten.

A cloud drive can generally be described as a tape drive used in a system where the user data segment is protected by some technique outside the tape drive (e.g., ECC encoding with different shards of the ECC encoded data sent to different tapes, duplicate copies of the data sent to different tapes, etc.) and that protection scheme can survive a certain level of loss (e.g., loss of n numbers of data blocks in some distribution). Systems in which cloud drives reside use a variety of different protection schemes, and a cloud drive using the methodology presented herein allows the "lossyness" of data written to the tape to be tuned to achieve the optimum point on the performance-reliability curve for the system as a whole as opposed to the drive as an individual. Also, the tuning of the "lossyness" on the write may be at some level where the lossyness is protected in the drive by the ECC application to the data and iterative decoding during reading.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various approaches may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that approaches of the present invention may be provided in the form of a service deployed on behalf of a customer to offer service on demand.

The descriptions of the various approaches of the present invention have been presented for purposes of illustration, but are not intended to be exhaustive or limited to the approaches disclosed. Many modifications and variations will be apparent to those of ordinary skill in the art without departing from the scope and spirit of the described approaches. The terminology used herein was chosen to best explain the principles of the invention, the practical application or technical improvement over technologies found in the marketplace, or to enable others of ordinary skill in the art to understand the approach disclosed herein.

What is claimed is:

1. A computer-implemented method, comprising:
    determine a first threshold T and a second threshold r for a rewrite condition, wherein the first threshold T is greater than zero, and wherein the second threshold r is greater than or equal to zero;
    writing codeword interleaves (CWIs) in a data set onto a plurality of simultaneously-written parallel tracks of a magnetic recording medium, wherein the data set includes a set of S sub-data sets, and wherein the set of S sub-data sets include a set number of the CWIs where the set number of the CWIs is associated with the length of a C2 code;
    reading the CWIs immediately after the CWIs are written to the magnetic recording medium;
    error correction decoding the read CWIs, wherein each CWI includes a set number of C1 or C1' codewords;
    determine whether at least one of the C1 or C1' codewords in each decoded CWI contains more byte errors than the second threshold r of the rewrite condition;
    for each sub-data set i in the set of S sub-data sets, where i is greater than or equal to 1 and less than or equal to S, inserting a number $b_i$ of the CWIs from sub-data set i, that satisfy the rewrite condition, into a rewrite buffer; and
    for each sub-data set i in the set of S sub-data sets, where i is greater than or equal to 1 and less than or equal to S, rewriting a number $b_i'$ of the $b_i$ CWIs in the rewrite buffer to the magnetic recording medium according to the following criteria:
    $b_i'=b_i-T$ when $b_i$ is greater than the first threshold T,
    $b_i'=0$ when $b_i$ is less than or equal to the first threshold T.

2. The computer-implemented method of claim 1, wherein the magnetic recording medium is a magnetic tape.

3. The computer-implemented method of claim 1, wherein the first threshold T corresponds to an error correction capability of a drive performing the method.

4. The computer-implemented method of claim 1, wherein the second threshold r corresponds to a raw bit error rate of a drive performing the method.

5. The computer-implemented method of claim 1, comprising determining whether one or more of the CWIs that have already been rewritten at least once satisfy the rewrite condition after another read-while-write and error correction decoding thereof; and in response to determining that one or more of the rewritten CWIs fail to satisfy the rewrite condition, rewriting one or more of the rewritten CWIs.

6. The computer-implemented method of claim 1, wherein the method is performed by a cloud drive.

7. The computer-implemented method of claim 1, comprising allowing adjustment to the rewrite condition.

8. The computer-implemented method of claim 7, wherein the allowed adjustment includes adjusting the rewrite condition to increase a raw bit error rate of a drive without adjusting a size of a designated rewrite area.

9. The computer-implemented method of claim 7, wherein the allowed adjustment includes reducing a size of a designated rewrite area without adjusting a current raw bit error rate of a drive.

10. The computer-implemented method of claim 7, wherein the allowed adjustment includes adjusting the rewrite condition such that no CWIs are rewritten.

11. The computer-implemented method of claim 7, comprising dynamically adjusting the rewrite condition to:
    at least once, increase a raw bit error rate of a drive without adjusting a size of a designated rewrite area, and
    at least once, reduce a size of a designated rewrite area without adjusting a current raw bit error rate of a drive.

12. A computer program product, the computer program product comprising a computer readable storage medium having program instructions embodied therewith, the program instructions executable by an apparatus to cause the apparatus to:

determine, by the apparatus, a first threshold T and a second threshold r for a rewrite condition, wherein the first threshold is greater than zero, and wherein the second threshold is greater than or equal to zero;

write, by the apparatus, codeword interleaves (CWIs) in a data set onto a plurality of simultaneously-written parallel tracks of a magnetic recording medium, wherein the data set includes a set of S sub-data sets, and wherein the set of S sub-data sets include a set number of the CWIs where the set number of the CWIs is associated with the length of a C2 code;

read, by the apparatus, the CWIs immediately after the CWIs are written to the magnetic recording medium;

error correction decode, by the apparatus, the read CWIs, wherein each CWI includes a set number of C1 or C1' codewords;

determine, by the apparatus, whether at least one of the C1 or C1' codewords in each decoded CWI contains more byte errors than the second threshold r of the rewrite condition;

for each sub-data set i in the set of S sub-data sets, where i is greater than or equal to 1 and less than or equal to S, insert, by the apparatus, a number $b_i$ of the CWIs from sub-data set i, that satisfy the rewrite condition, into a rewrite buffer; and for each sub-data set i in the set of S sub-data sets, where i is greater than or equal to 1 and less than or equal to S, rewrite, by the apparatus, a number $b_i'$ of the $b_i$ CWIs in the rewrite buffer to the magnetic recording medium according to the following criteria:

$b_i'=b_i-T$ when $b_i$ is greater than the first threshold T, $b_i'=0$ when $b_i$ is less than or equal to the first threshold T.

13. The computer program product of claim 12, wherein the first threshold T corresponds to an error correction capability of the apparatus, wherein the second threshold r corresponds to a raw bit error rate of the apparatus.

14. The computer program product of claim 12, comprising program instructions for allowing adjustment to the rewrite condition, wherein the allowed adjustment includes adjusting the rewrite condition to increase a raw bit error rate of a drive without adjusting a size of a designated rewrite area.

15. The computer program product of claim 12, comprising program instructions for allowing adjustment to the rewrite condition, wherein the allowed adjustment includes reducing a size of a designated rewrite area without adjusting a current raw bit error rate of a drive.

16. The computer program product of claim 12, comprising program instructions for allowing adjustment to the rewrite condition, wherein the allowed adjustment includes adjusting the rewrite condition such that no CWIs are rewritten.

17. An apparatus, comprising:

a controller; and logic integrated with the controller, executable by the controller, or integrated with and executable by the controller, the logic being configured to:

determine a first threshold T and a second threshold r for a rewrite condition, wherein the first threshold is greater than zero, and wherein the second threshold is greater than or equal to zero;

write codeword interleaves (CWIs) in a data set onto a plurality of simultaneously-written parallel tracks of a magnetic recording medium, wherein the data set includes a set of S sub-data sets, and wherein the set of S sub-data sets include a set number of the CWIs where the set number of the CWIs is associated with the length of a C2 code;

read the CWIs immediately after the CWIs are written to the magnetic recording medium;

error correction decode the read CWIs, wherein each CWI includes a set number of C1 or C1' codewords;

determine whether at least one of the C1 or C1' codeword in each decoded CWI contains more byte errors than the second threshold r of the rewrite condition;

for each sub-data set i in the set of S sub-data sets, where i is greater than or equal to 1 and less than or equal to S, insert a number $b_i$ of the CWIs from sub-data set i, that satisfy the rewrite condition, into a rewrite buffer; and for each sub-data set i in the set of S sub-data sets, where i is greater than or equal to 1 and less than or equal to S, rewrite a number $b_i'$ of the $b_i$ CWIs in the rewrite buffer to the magnetic recording medium according to the following criteria:

$b_i'=b_i-T$ when $b_i$ is greater than the first threshold T, $b_i'=0$ when $b_i$ is less than or equal to the first threshold T.

18. The apparatus of claim 17, comprising logic configured to allow adjustment to the rewrite condition, wherein the allowed adjustment includes adjusting the rewrite condition to increase a raw bit error rate of a drive without adjusting a size of a designated rewrite area.

19. The apparatus of claim 17, comprising logic configured to allow adjustment to the rewrite condition, wherein the allowed adjustment includes reducing a size of a designated rewrite area without adjusting a current raw bit error rate of a drive.

20. The apparatus of claim 17, comprising logic configured to allow adjustment to the rewrite condition, wherein the allowed adjustment includes adjusting the rewrite condition such that no CWIs are rewritten.

\* \* \* \* \*